United States Patent [19]
Bell

[11] 3,889,232
[45] June 10, 1975

[54] SENSOR ASSEMBLY FOR USE IN A VEHICLE EQUIPPED WITH A GAS BAG RESTRAINT SYSTEM

[75] Inventor: Lon E. Bell, Altadena, Calif.
[73] Assignee: Technar Incorporated, Arcadia, Calif.
[22] Filed: Aug. 13, 1973
[21] Appl. No.: 387,720

Related U.S. Application Data
[63] Continuation-in-part of Ser. No. 175,528, Aug. 27, 1971, abandoned.

[52] U.S. Cl. .............. 340/52 H; 340/61; 180/103
[51] Int. Cl. ........................................ G08b 19/00
[58] Field of Search ............ 340/52 H, 53, 61, 262; 180/91, 103, 104; 200/61.45 R; 307/10 R

[56] References Cited
UNITED STATES PATENTS
3,629,816  12/1971  Gillund .............................. 340/61
3,633,159  1/1972  Dillman ........................... 340/52 H
3,750,100  7/1973  Ueda .............................. 340/52 H Primary Examiner—Alvin H. Waring
Attorney, Agent, or Firm—Jonathan Plaut; Ernest D. Buff

[57] ABSTRACT

A crash sensor assembly disposed in a vehicle equipped with a gas bag restraint system and the method of using the sensor to activate the restraint system. The assembly comprises a deceleration sensor switch means and a second sensor switch means which are both closed upon collision of the vehicle. Upon closing of these switch means a signal is sent to an activation means which initiates gas bag inflation. A continuity comparator means sends a signal to a circuit breaking means in the event that one but not both switch means closes to deactivate the assembly.

13 Claims, 5 Drawing Figures

3,889,232

SENSOR ASSEMBLY FOR USE IN A VEHICLE EQUIPPED WITH A GAS BAG RESTRAINT SYSTEM

CROSS-REFERENCE TO RELATED APPLICATIONS

This application is a continuation-in-part of my copending application Ser. No. 175,528, filed Aug. 27, 1971, and now abandoned, entitled "Sensor Assembly For Use In A Vehicle Equipped With A Gas Bag Restraint System".

BACKGROUND OF THE DISCLOSURE

The instant invention is directed to a vehicle crash sensor assembly. More particularly, the instant invention is directed to a vehicle crash sensor assembly activated upon collision of the vehicle in which it is disposed when the collision results in plurality of collision criteria, such as preset deceleration levels at various locations or a combination of deceleration and crushing of the vehicle. Still more particularly, the instant invention is directed to a crash sensor assembly disposed in a vehicle which senses a collision and generates a signal, based on a vehicle impact of sufficient deceleration at various locations or a combination of deceleration and crushing forces, and provided with means to deactivate the assembly if only one collision criterion is met.

In order to reduce the number of deaths and serious injuries accompanying motor vehicle accidents much research effort has been expended in development of passive restraint systems in motor vehicles. Of all the passive restraint systems advanced, inflatable gas bag assemblies have been recognized as the most promising.

The success of an inflatable gas bag assembly is directly related to the ability to provide a sufficiently sensitive sensing device to trigger inflation of these inflatable gas bag assemblies immediately after impact to restrain vehicle occupants. Similarly, the inverse must also be provided by a sensitive sensing device. That is, the sensing device must not provide a signal to inflate one or more gas bags at any time except immediately following a collision of the vehicle.

These two requirements are in certain respects contradictory. Thus, a very sensitive sensor may provide excellent gas bag inflation characteristics upon collision of the vehicle, but, may also be so sensitive as to inflate after a sudden stop and other non-collision event. On the other hand, a sensor assembly which will not inflate during a non-collision event may not provide the necessary sensitivity to inflate immediately following a collision of the vehicle.

A suggested solution to this problem is to employ a double criteria sensor. In this case two sensors based on different criteria are required to be triggered prior to activation of the gas bag assembly. In the past such a system was not advanced due to the problem of failure of one of the two sensors to be activated. Thus, in such a case the first triggering of the sensors is successful in that the failure to inflate the gas bag is desirable because the impact does not meet the restraint criteria. However, activation of the inflatable gas bag assembly in the next impact event would be based on activation of only one criterion, the non-activated sensor. Therefore, in the prior art a dual criteria system often breaks down to a single criterion system.

SUMMARY OF THE INVENTION

The instant invention is directed to a crash sensor assembly which is sensitive to a collision of the vehicle in which it is installed while providing safeguards against inadvertent sensing of a collision which does not require gas bag restraint. Features are also provided to insure total operability of the system at all times.

In accordance with the instant invention, a collision sensor assembly is provided in a vehicle equipped with a gas bag restraint assembly. The assembly includes a deceleration sensor switch means, a second sensor switch means, such as a deceleration or a crush sensor switch means, in electrical communication with a signal generating means. The switch means are closed upon a collision of the vehicle which exceeds fixed deceleration or combined deceleration and crushing forces. The electrical signal generating means generates a signal upon closing of the switch means. The signal, in turn, activates a gas generating means which causes inflation of an inflatable gas bag assembly. A continuity comparator means is provided to deactivate the sensor assembly in the event that one of the two switch means is not closed within a fixed time period following closing of the other switch means.

BRIEF DESCRIPTION OF THE DRAWINGS

The instant invention may be better understood by reference to the accompanying drawings of which.

DETAILED DESCRIPTION

Figure 1:
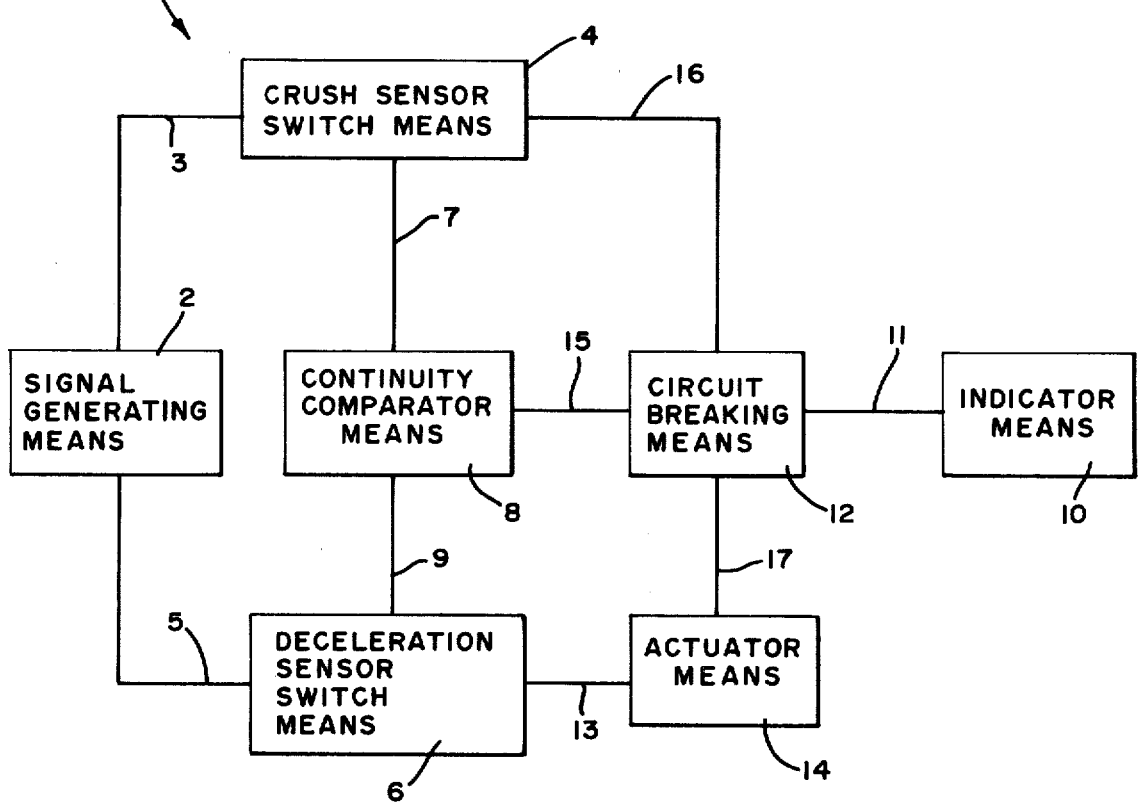
FIG. 1 is a schematic block diagram of a preferred embodiment of the crash sensor assembly of the instant invention.

A preferred embodiment of a crash sensor assembly is generally indicated at 1 in FIG. 1. The crash sensor assembly 1 includes an electrical signal generating means 2 which provides a signal which is electrically communicated by parallel electrical conduits 3 and 5 to a crush sensor switch means 4 and a deceleration sensor switch means 6 respectively. The switch means 4 and 6, which may be open or closed, are electrically connected to a circuit breaking means 12 and an actuator means 14 by electrical conduits 16 and 13 respectively. The actuator means 14 and the circuit breaking means 12 are connected together electrically by electrical conduit 17.

A continuity comparator means 8 is electrically connected to the crush sensor switch means 4 and the deceleration sensor switch means 6 by electrical conduits 7 and 9 respectively. In turn, the continuity comparator means 8 is electrically connected to the circuit breaking means 12 by electrical conduit 15. An electrical conduit 11 is preferably provided to electrically communicate between the circuit breaking means 12 and an indicator means 10.

The crush sensor assembly 1 is continually provided with an electrical signal by the electrical signal generating means 2. The signal is transmitted through electrical conduits 3 and 5 to the crush sensor switch means 4 and the deceleration sensor switch means 6 respectively. In normal operation these switch means are open so that the signals are cut off at these points. In the event, however, of a collision the sudden stopping activates the deceleration sensor switch means 6 closed. Also, the crushing effect of the collision closes the crush sensor switch means 4. Of course, both the deceleration sensor and the crush sensor switch means 6 and 4 are activated only if the deceleration and crushing of the vehicle exceed a fixed minimum. This minimum is set to correspond to the deceleration and crushing forces resulting from a predetermined impact.

Upon closing of the switch means 4 and 6, the electrical signal is able to flow through conduits 16, 17 and 13 to complete the circuit. This results in flow across the actuator means 14. When the signal reaches the actuator means 14, the gas bag assembly is actuated with the resultant inflation of the gas bag provided in the vehicle to constrain the occupants.

It should be appreciated that the invention described above is a significant advance over prior art passive restraint systems which are usually limited to a single crash criterion. Usually this criterion either is deceleration or crushing of the vehicle. In the event that a deceleration sensor is employed, the gas bag assembly could be activated in certain unusual circumstances upon a sudden stop unaccompanied by significant impact of the vehicle. Similarly in the event that gas bag activation is based on a crushing criterion solely, the gas bag assembly could be activated when not moving, for instance when the vehicle is parked or is moving very slowly and hits a stationary object or other slow moving vehicle under conditions which cause a significant crushing of the vehicle. In such cases the impact on occupants of the vehicle is not severe enough to require gas bag inflation. Whereas in the prior art such events would result in gas bag inflation, in the instant invention gas bag activation does not occur.

In addition to the advantages mentioned above, the instant invention has a unique safety feature provided by the continuity comparator means 8, in electrical communication with the crush sensor switch means 4 and the deceleration sensor switch means 6 through conduits 7 and 9 respectively, which is electrically signaled by either of these switch means upon its closing. Unless a corresponding electrical signal is transmitted to the comparator means 8 within a preset period of time, the comparator means 8 sends an electrical signal to the circuit breaking means 12 through conduit 15 to break the circuit to deactivate the assembly 1. Thus, in the highly unlikely event that one of the two sensor switch means closes without the corresponding closing of the second switch means, the assembly 1 is deactivated. This prevents a situation from arising in which activation of the gas bag assembly becomes dependent upon a single crash criterion. Thus, the continuity comparator means 8 prevents the condition that resulted in the prior art design.

In order for the effectiveness of the continuity comparator means 8, to be complete, an indicator means 10 is preferably provided to inform vehicle occupants of the inoperability of the vehicle's gas bag restraint system. This is accomplished by an electrical signal that is sent, by way of electrical conduit 11, to the indicator means 10 upon activation of the circuit breaking means 12.

Figure 2:
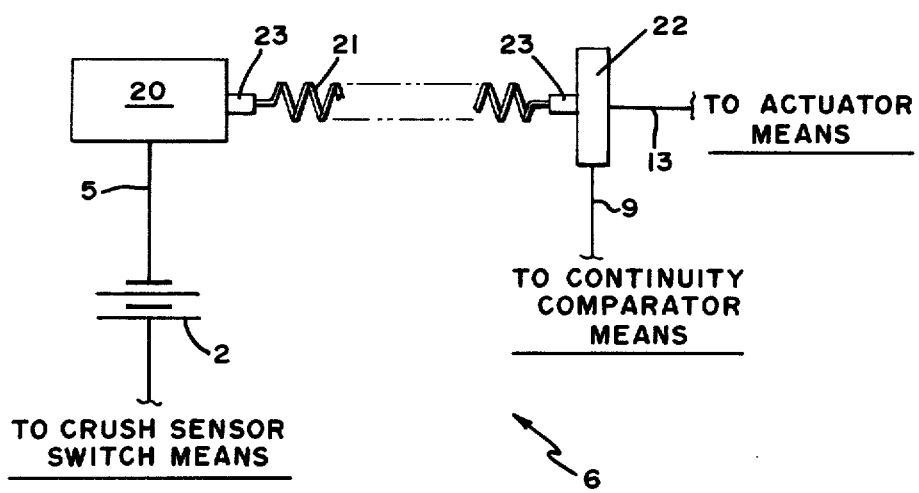
FIG. 2 is a schematic illustration of the deceleration sensor switch means of the instant invention.

Turning now to a more detailed examination of the components of the assembly 1, FIG. 2 illustrates the principal of operation of the deceleration sensor switch means 6. In FIG. 2 a calibrated mass 20 is non-conductively connected to an electrical contact means 22 by means of a biasing means 21 which biases against movement of the mass 20 toward the contact member 22. In a preferred embodiment the biasing means 21 is a spring. The biasing is provided with insulating material 23 at the connecting points between the biasing means 21 and the mass 20 and between the biasing means 21 and the contact means 22. Thus, in order for the deceleration sensor switch means 6 to be activated, movement of the mass 20 toward the control means 22 causes electrical contact to be made with the contact means 22. Upon contact a signal is transmitted by means of electrical conduits 5 and 13 to the actuator means 14 and by means of conduit 9 to the continuity comparator means 8. A signal generating means 2, preferably a low voltage battery, is disposed in electrical communication with the mass 20 through line 5 to provide electrical energy to contact member 22 upon contact of mass 20 therewith. The biasing means 21 is designed to yield against the force of a predetermined deceleration of the vehicle. Thus, this design permits adjustability of the deceleration force required to close the deceleration sensor switch means 6.

Figure 3:
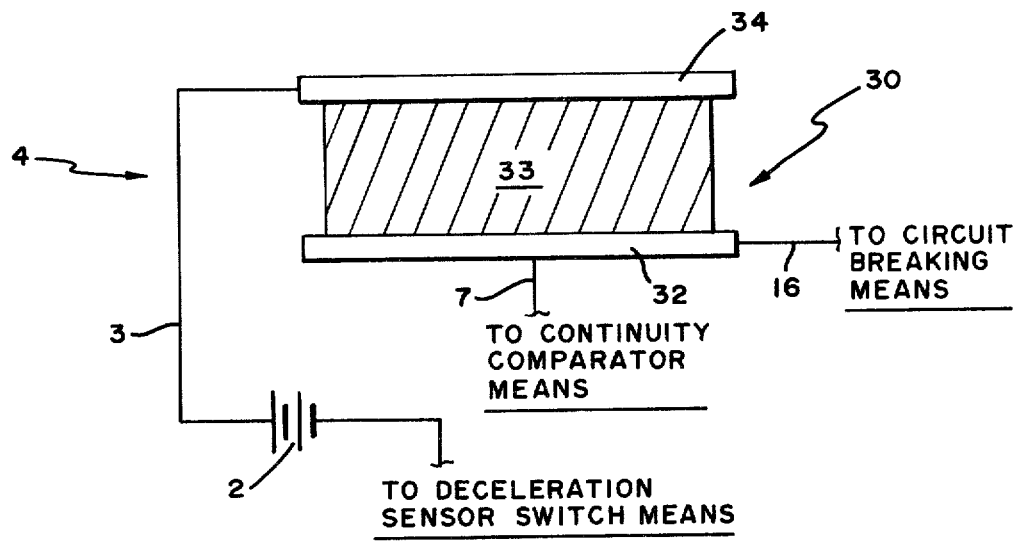
FIG. 3 is a schematic representation of the crush sensor switch means of the instant invention.

FIG. 3 illustrates the principle of operation of the crush sensor switch means 4. The crush sensor switch means 4 is comprised, in a preferred embodiment, of a plurality of crush sensor units generally indicated at 30 which are disposed at various locations inside the surface of the vehicle. Each of these units 30 comprises a pair of electrically conductive members 32 and 34. In a preferred embodiment members 32 and 34 are made of an electrically conductive metal such as stainless steel, gold plated copper or the like. The members are separated by a compressible electrically non-conductive material 33 such as a polyvinyl chloride foam, foam rubber or the like. The members 32 and 34 are electrically connected, by means of electrical conduits 16 to fuse link 18 (shown in FIG. 4) of circuit breaking means 12 and by means of conduit 7 to continuity comparator means 8. Upon sufficient impact of the vehicle, the crushing of the vehicle causes the members 32 and 34 to contact one another and transmit the electrical circuit through conduit 3, the members 32 and 34 conduit 16, circuit breaking means 12 and conduit 17 to actuator means 14 and through conduit 7 to the continuity comparator means 8. Signal generating means 2, preferably a low voltage battery, is disposed in electrical communication with the plurality of crush sensor members 32 and 34 to provide the electrical current. The compressibility of the material 33 is predesigned to provide a predesigned crushing force necessary to cause contact of the strips 32 and 34. Thus, it is seen that this design permits adjustability of the crushing force required to close the crush sensor switch means 4.

In another embodiment, the second or crush sensor discussed above may be replaced by a second deceleration switch actuated at the same or a different level of deceleration. An alternate type of deceleration sensor is disclosed in copending application of Bell. Ser. No.

117,560, filed Feb. 22, 1971. Such sensor would be set to be sensitive to the deceleration condition existent upon a crash situation. A single sensing device incorporating two separate sensing means, such as different deceleration levels, may be used to provide for the dual sensing required for operation of the system.

Figure 4:
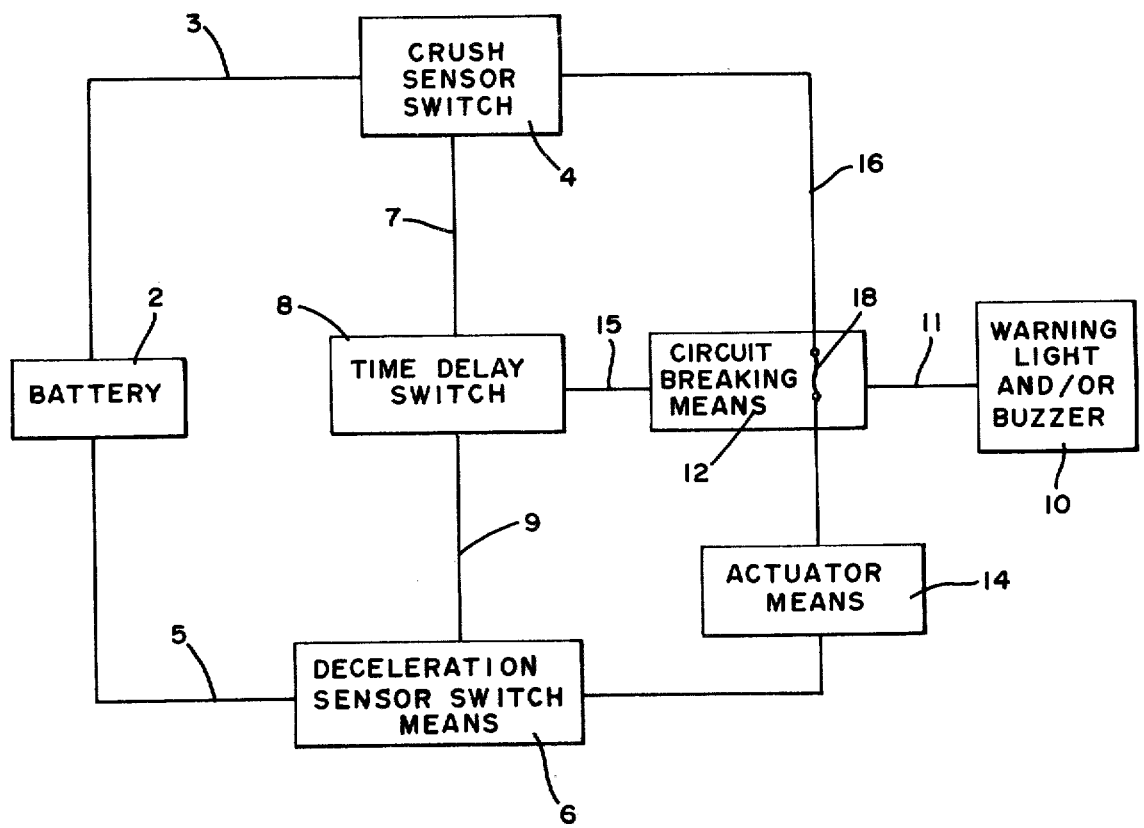
FIG. 4 is a schematic electrical block diagram of the crash sensor assembly of the instant invention.

FIG. 4 provides a second electrical block diagram of the assembly 1 in which more detailed apparatus is provided. In this figure like numbered preferred detailed embodiments of the more generally indicated elements have been used. Thus the electrical signal generating means 2 may be the standard vehicle storage battery. The electrical conduits 3 and 5, connecting the battery 2, as well as all the electrical conduits in the assembly are common copper wire. Wires 3 and 5 connect the battery 2 to the crush sensor switch 4 and the deceleration sensor switch 6 respectively. These switches may comprise any one of hte many well known electrically operated open-close switches available in the market.

The switches 4 and 6 are connected by electrical wires to the actuator means 14 which, in a preferred embodiment, is an electrical device which by electrical signal actuates the gas generating means. For example, flow through the actuator may heat a resistor which in turn ignites an ignitor connected to a combustible material.

The continuity comparator means may be a time delay switch 8 adapted to be activated to generate a signal after a preselected time period following transmission of a signal through conduit 7 or 9 to the switch 8 by one of the two sensors 4 or 6. Unless a second signal is transmitted to the switch 8 by the other sensor within the preselected time period set for generation of the signal from the time delay switch 8, the generated signal is conveyed through wire 15 to circuit breaking means 12, to deactivate the assembly 1. The asembly circuit is deactivated by causing the electrical signal to pass through and heat a resistor, such as a thermal resistor 52 shown in FIG. 5, disposed adjacent to the fuse link 18, thereby breaking the fuse link 18 to open the circuit.

In a preferred embodiment, upon breakage of the link 18 a signal is transmitted by electrical wire 11 to either a warning light, disposed on the vehicle dashboard, which illuminates the light to indicate inoperability of the gas bag restraint system, or to a buzzer which is thereby sounded to indicate this inoperability. A third alternative is to have the signal transmitted to both a light and a buzzer. These various indicator means are all identified in FIG. 4 at 10.

Figure 5:
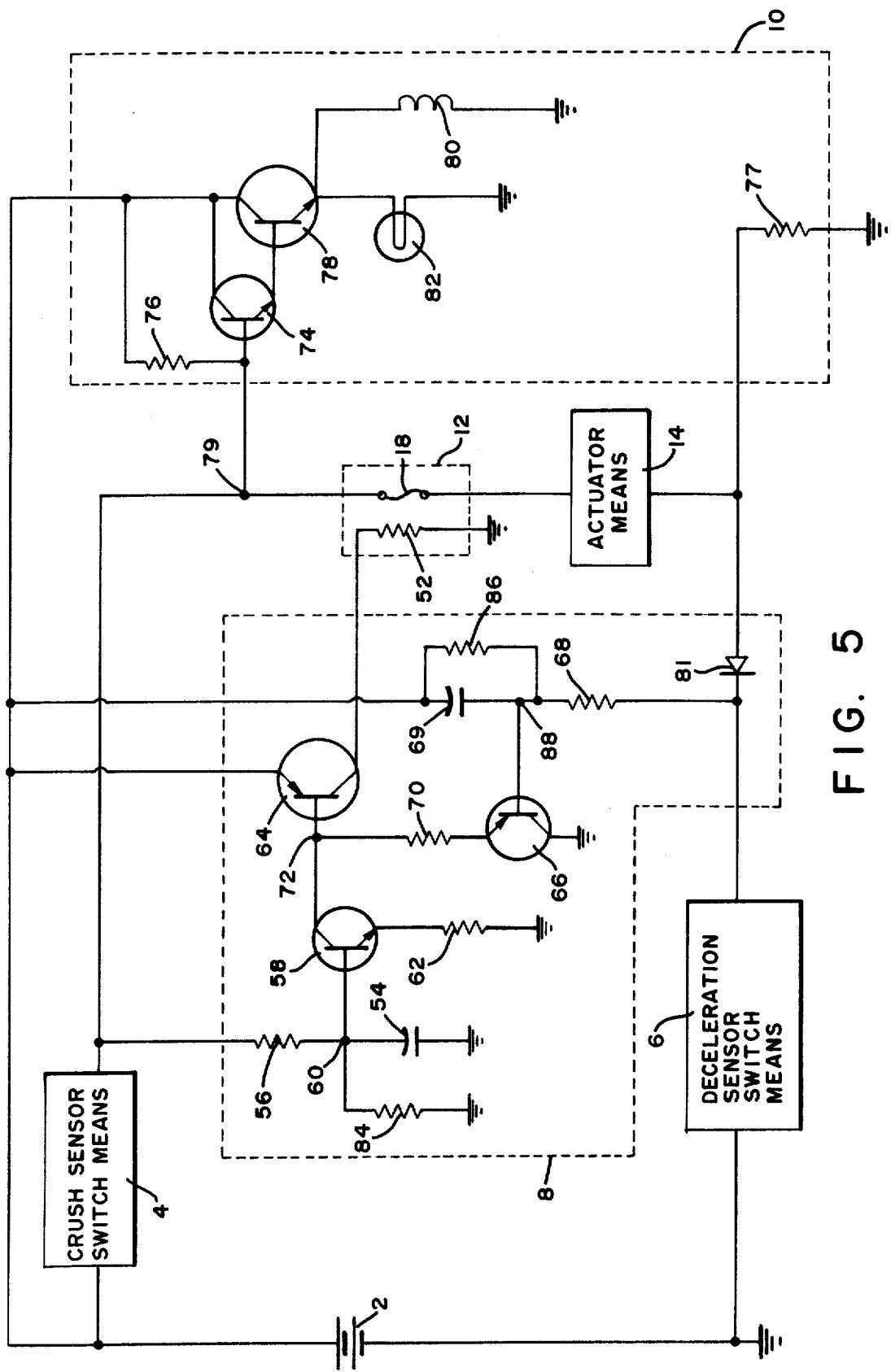
FIG. 5 is a diagrammatic representation of the sensor assembly of FIG. 4 in which the time delay switch means, the circuit breaking means and the indicator means are shown schematically.

In FIG. 5 there is illustrated a diagrammatic representation of the assembly in which the battery 2, time delay switch means 8, circuit breaking means 12 and indicator means 10 are shown schematically.

The time delay switch 8 may include (1) a capacitor 54 connected between ground and the crush sensor switch means 4 through a first resistor 56, (2) a first transistor 58 having its base connected to a junction 60 between capacitor 54 and resistor 56 and its collector-emitter circuit grounded through a resistor 62, (3) a second transistor 64 having its base in series with the collector of transistor 58 and its collector-emitter circuit in series with and between battery 2 and a resistance path to ground provided by thermal resistor 52 of circuit breaking means 12 and (4) a third transistor 66 having its base connected to battery 2 through a capacitor 69 and to deceleration sensor means 6 through a resistor 68, its collector connected to ground and its emitter connected through resistor 70 to a junction 72 between the base of transistor 64 and the collector of transistor 58. In addition, the time delay switch 8 may include resistors 84 and 86 which function to bleed down the capacitors 54 and 69, respectively, when voltage is not applied thereto by the battery 2. The time delay switch 8 may also include a diode 81 which serves to block flow of current through actuator means 14, fuse link 18 to resistor 56 and the base-emitter circuit of transistor 58, and also to the base emitter circuits of transistors 74 and 78, respectively.

The indicator means 10 may include a first transistor 74 having its base connected to battery 2 through two separate paths, one path containing crush sensor switch means 4 and the other path containing a resistor 76, and its collector-emitter circuit in series with the series combination of a second transistor 78 and an alarm means such as the coil 80 and lamp 82 of an audiovisual alarm. Second transistor 78 has its base-emitter circuit in series with and between the emitter of transistor 74 and the coil and lamp of the audio-visual alarm and its collector-emitter circuit in series with and between battery 2 and the lamp and coil of the alarm. A bias resistor 77 connected between ground and each of the actuator means 14 and the deceleration sensor switch means 6 serves to maintain the voltage potential at junction 79 below the value required to energize transistor 74.

During normal operation of a vehicle in which the assembly 1 is disposed, the time delay switch means 8 is quiescent, with the result that no current passes through resistor 52. In the event that the crush sensor switch means 4 becomes permanently closed or otherwise develops a short circuit, voltage is applied to capacitor 54 through resistor 56. Application of the voltage to capacitor 54 raises the base voltage of transistor 58 by an amount sufficient to bias the transistor 58 on. Upon energization of transistor 58, a ground path is provided for the base of transistor 64 through the collector-emitter circuit of transistor 58 and resistor 62, thereby biasing transistor 64 on. Voltage applied to resistor 52 through the collector-emitter circuit of transistor 64 heats the resistor 52. The heat provided by resistor 52 causes fuse link 18 to melt and become open, whereby energization of the actuator means 14 is prevented. In like manner a defective condition such as a short within the deceleration sensor switch means 6 grounds resistor 68 and lowers the potential at junction 88 by an amount sufficient to bias transistor 66 on. Upon energization of transistor 66 a ground path is provided for the base of transistor 64 through resistor 70 and the collector-emitter circuit of transistor 66, biasing transistor 64 on. Voltage applied through the collector-emitter circuit of transistor 64 to the resistor 52 heats and disables fuse link 18 causing deactivation of the assembly 1.

The impedance path provided through fuse link 18, actuator means 14 and bias resistor 77 normally has about one twentieth of the value of the resistor 76. As a result, the voltage potential at the base of transistor 74 remains below the threshold value required to energize the transistor 74. In the event that the fuse link 18 becomes disabled due to a defective condition, such as a short in either of the sensors 4 and 6 or an open circuit occurs in the actuator means 14, voltage applied to resistor 76 from battery 2 will increase the potential at the base of transistor 74 and bias the transistor 74 on. Upon energization of transistor 74 voltage is applied to the base of transistor 78 through the collector-emitter circuit of transistor 74. The transistor 78 is thereby energized and transmits current through its collector-emitter circuit to energize the coil 80 and lamp 82, warning vehicle occupants of the defective condition.

The preselected time period required for generation of the signal by the time delay switch 8 depends upon the time required to charge capacitors 54 and 69. Generally, the charging time for the capacitors 54 and 69 and hence the preselected time interval, is greater than, and preferably in the order of about 10 to 20 times as long as, the time lapse extant between actuation of the deceleration switch sensor 6 and the crush sensor switch means 4 when the vehicle is involved in a collision. Typical values for the components used to construct the time delay switch means 8 and the indicator means 10 of FIG. 5 are shown in Table I below.

TABLE I

| Component | | Values |
|---|---|---|
| resistor | 56 | 20,000 ohms |
| resistors | 84 and 86 | 3,900 ohms |
| resistor | 62 | 470 ohms |
| resistor | 70 | 470 ohms |
| resistor | 68 | 20,000 ohms |
| resistor | 76 | 200,000 ohms |
| resistor | 52 | 50 ohms |
| transistor | 58 | 2N4400 |
| transistor | 64 | 2N5193 |
| transistor | 66 | 2N4402 |
| transistors | 74 and 78 | MPSU45 |
| Diode | 81 | GE TYPE A 115 C |
| capacitors | 54 and 69 | 250 microfarads |
| lamp | 82 | 12 volt, .5 amperes |
| coil | 80 | 12 volts, 50 ohms |

Having thus described the invention in rather full detail, it will be understood that these details need not be directly adhered to but that various changes and modifications may suggest themselves to one skilled in the art, all falling within the scope of the present invention as defined by the subjoined claims. For example, instead of operating the circuit breaker by the closing of either sensor switch means while the other remains open, it may be desirable that the circuit breaker be operated only when the crush sensor switch means is closed and the deceleration sensor switch means open. This would involve merely breaking the connection between resistor 70 and junction 72 or eliminating the transistor circuit 66 entirely.

What is claimed is:

1. A crash sensor assembly disposed in a vehicle comprising:

an electrical signal generating means;

a deceleration sensor switch means in electrical communication with said signal generating means;

a second sensor switch means in electrical communication with said signal generating means;

an actuating means, in electrical communication with said second sensor switch means and said deceleration sensor switch means, to activate a gas bag restraint system disposed in said vehicle upon closing of both said second and said deceleration switch means;

a continuity comparator means, in electrical communication with said second sensor switch means and said deceleration sensor switch means, the comparator means including means to electrically sense and generate an output signal when one of said switch means is closed for longer than a predetermined time interval before the other switch means closes; and a circuit breaking means, disposed in electrical communication with said continuity comparator means responsive to said output signal for deactivating said crash sensor assembly upon receipt of said output signal sent to it by said continuity comparator means.

2. An assembly in accordance with claim 1 wherein said continuity comparator means comprises a time delay switch means provided with means to delay transmission of said signal to said circuit breaking means for a preset period of time following closing of one of said switch means.

3. An assembly in accordance with claim 2 wherein said time delay switch means includes a first capacitor connected between ground and said second sensor switch means through a first resistor, a first transistor having its base connected to a junction between said capacitor and said resistor and its collector-emitter circuit grounded through a second resistor, a second transistor having its base connected in series with the collector of said first transistor and its collector-emitter circuit in series with said signal generating means and grounded through a thermal resistor of said circuit breaking means, and a third transistor having its base connected to said signal generating means through a second capacitor and to said deceleration sensor switch means through a third resistor, its collector connected to ground and its emitter connected through a fourth resistor to a junction in series with and between the base of said second transistor and the collector of said first transistor, said base of said third transistor being decoupled from said actuator means by a diode.

4. An assembly in accordance with claim 3 wherein said circuit means additionally includes a fuse link disposed adjacent to said thermal resistor and adapted to become open upon application of voltage to said thermal resistor.

5. An assembly in accordance with claim 1 including indicator means, in electrical communication with said circuit breaking means, activated by a signal transmitted by said circuit breaking means upon deactivation of said assembly.

6. An assembly in accordance with claim 4 wherein said indicator means includes a first transistor having its base connected to said signal generating means through at least two separate paths, one of said paths containing said second sensor switch means and another of said paths containing a resistor, and its collector-emitter circuit in series with the series combination of a second transistor and an alarm means, said second transistor having its base-emitter circuit in series with and between the emitter of said first transistor and said alarm means and its collector-emitter circuit in series with and between said signal generating means and said alarm means, and a bias resistor connected between ground and each of said deceleration sensor switch means and said actuator means.

7. An assembly in accordance with claim 5 wherein said indicator means comprises a warning light which is illuminated upon activation of said indicator means.

8. An assembly in accordance with claim 5 wherein said indicator means comprises a buzzer which is sounded upon activation of said indicator means.

9. An assembly in accordance with claim 1 wherein said second sensor switch means comprises a plurality of sensors disposed on said vehicle, each of said sensors including a pair of electrically conductive members separated by a compressible electrically non-conductive material, the first of said electrically conductive members being connected to said signal generating means and the second of said electrically conductive members being connected to each of said continuity comparator means and the series combination of said circuit breaking means and said actuator means.

10. An assembly in accordance with claim 1 wherein said deceleration sensor switch means comprises an electrically conductive mass disposed in said vehicle in electrical communication with said electrical signal generating means, an electrically conductive contact means in electrical communication with each of said continuity comparator means and the series combination of said actuator means and said circuit breaking means and a non-conductive biasing means connected to said mass and said contact means and adapted to bias said mass away from said contact member, whereby said mass is adapted for displacement into contact with said contact member in response to forces resulting from a predetermined deceleration of said vehicle.

11. An assembly in accordance with claim 1, wherein said second sensor switch means comprises a crush sensor means.

12. An assembly in accordance with claim 1 wherein said second sensor switch means comprises a plurality of sensors.

13. An assembly in accordance with claim 1 wherein said deceleration sensor switch means comprises a plurality of sensors.

* * * * *